United States Patent [19]

Harada

[11] Patent Number: 4,725,307

[45] Date of Patent: Feb. 16, 1988

[54] METHOD OF TREATING DUST AND SLUDGE SIMULTANEOUSLY WITH STEEL SLAG

[75] Inventor: Akihisa Harada, Kitakyushu, Japan

[73] Assignee: Nippon Jiryoku Senko Co., Ltd., Fukuoka, Japan

[21] Appl. No.: 945,614

[22] Filed: Dec. 23, 1986

[51] Int. Cl.$^4$ ............................ C21B 3/04; C22B 7/02
[52] U.S. Cl. .......................................... 75/10.29; 75/3; 75/10.3; 75/25
[58] Field of Search ................. 75/310.29, 24, 25, 10.3

[56] References Cited

U.S. PATENT DOCUMENTS 3,150,958  9/1964  Collin .................................. 75/10.38
4,213,779  7/1980  Caswell ................................... 75/3
4,376,043  3/1983  Heijwegen .............................. 75/25

Primary Examiner—Peter D. Rosenberg
Attorney, Agent, or Firm—Armstrong, Nikaido, Marmelstein & Kubovcik

[57] ABSTRACT

A method of modifying dust and sludge simultaneously with steel slag produced in a steel making process. In a reactor equipped with a heating electrode, a predetermined amount of a hydrous silicate mineral as a modifier is fed to molten steel slag having a high temperature to decompose the hydrous silicate mineral, causing the molten steel slag to the stirred with a gas produced as the result of the decomposition and the slag modifying reaction to be promoted, whereby the dust, sludge and steel slag produced in a steel making process not only can be made harmless but also can be effectively reused.

7 Claims, 6 Drawing Figures

METHOD OF TREATING DUST AND SLUDGE SIMULTANEOUSLY WITH STEEL SLAG

BACKGROUND OF THE INVENTION

This invention relates to a method of treating dust and sludge produced from an iron mill simultaneously with molten steel slag produced in a steel making process by mixing the dust and sludge with the slag.

In general, dust and sludge produced in the steel making process in an iron mill contain iron oxide as main component and also zinc, lead, cadmium, chromium, nickl copper, manganese, etc. as minor components. Because of the presence of the above minor components, difficulties were encountered in disposing of them as industrial wastes, which required a huge cost for the disposal.

Meanwhile, in an iron mill, a steel slag is produced in the steel making process in a converter or an electric furnace. Although studies have been made on its reuse as resources, the reuse of the whole amount of the slag produced has not been realized, and the slag has been disposed as waste, because of its swelling and crumbling properties attributable to the presence of free lime, $2CaO$, $SiO_2$, etc. in the steel slag.

Accordingly, attempts have been made to modify the steel slag which had been disposed as waste so that the swelling and crumbling of the slag can be prevented. For example, conventional methods for modification of slag include a method as disclosed in U.S. Pat. No. 4,179,279 in which a red mud (in some cases nonferrous metal slag, decomposed granite and slate) is added as a modifier in a predetermined amount to molten steel slag.

However, since no sufficient mixing of the modifiers with the slag can be attained by mere addition thereof to the slag, a bubbling gas was introduced into the molten steel slag using a lance pipe to induce convection of the molten steel slag, thereby causing a slag modifying reaction.

Therefore, the above method has drawbacks such as necessity of the use of a lance pipe for introduction of a bubbling gas into molten steel slag and an apparatus for supporting the lance pipe.

Further, the above method is disadvantageous also in that wasteful labor and equipment are required, because the lance pipe inserted into the molten steel slag is attacked in its inserted portion by the molten steel slag is attacked in its inserted portion by the molten steel slag, which requires frequent repair and replacement thereof.

In the conventional method, when the temperature of the gas introduced into the molten steel slag through a lance pipe is too low or the amount of the modifier or dust or sludge added is too large, the molten steel slag is cooled, leading to poor convection of the molten steel slag, which in turn causes an insufficient slag modifying reaction which is endothermic.

SUMMARY OF THE INVENTION

In view of the above situations, it is an object of the present invention to provide a method capable of recovering metals contained in dust, sludge and molten steel slag by promoting a reaction between the molten steel slag, slag modifier and dust and sludge without introduction of a bubbling gas into the molten steel slag.

It is another object of the present invention to provide a method of making the detrimental metals contained in dust and sludge harmless and effectively utilizing steel slag from which the metals have been removed.

It is a further object of the present invention to provide a method of treating a large amount of dust and sludge by keeping the temperature of the molten steel slag constant while positively utilizing the sensible heat of the molten steel slag per se and receiving the heat in a sufficient amount from a heating electrode.

According to the present invention, the above objects can be attained by a method of treating dust and sludge simultaneously with steel slag, comprising the steps of:

(1) kneading dust and sludge produced from a steel making process after addition of 5 to 20 wt% of a reducing agent thereto with an agglomerator to form agglomerates having a grain size of 5 to 80 mm (2) charging a reactor provided with a heating electrode for with molten steel slag to be processed, 5 to 30 wt%, based on said molten steel slag, of said agglomerates and 5 to 20 wt%, based on said molten steel slag, of a hydrous silicate mineral, mixing them in said reactor and flowing a current in said auxiliary electrode to decompose said hydrous silicate mineral while maintaining said mixture at a constant temperature, thereby causing bubbling in the mixture and a slag modifying reaction.

(3) collecting lead and zinc vaporized from said molten steel slag in the step (2) with a filter dust collector.

(4) solidifying and crushing said molten steel slag which has been treated in the step (2), and (5) separating the resulting crushed steel slag into a metal component and a slag component with a known separation means including magnetic separation and gravity separation.

The term reducing agent as used herein is intended to mean a coke powder, an aluminium powder, ferrosilicon, etc. It is preferred that the amount of the reducing agent be about 1 to 3 times the theoretical amount required for reduction. Particularly, when a coke powder is used as the reducing agent, it is preferred that the coke be not used in an amount exceeding the necessary amount, because the presence of an excess amount of the coke powder inhibits the formation of coarse metal particles by coagulation of metal particles formed by reduction.

The term "hydrous silicate mineral" as used herein is intended to mean obsidian, perlite, pitchstone or any mixture thereof or a mixture of alum having a large amount of water of crystallization with a silicate mineral. Further, in the present invention, the abovementioned hydrous silicate may be used in the following manner. The hydrous silicate mineral is crushed into pieces having a suitable size and mixed with dust and sludge to form agglomerates. Then, the agglomerates thus formed are fed into the above-mentioned reactor equipped with a heating electrode The method of feeding the above agglomerates and hydrous silicate mineral into the reactor include a method in which the agglomerates and hydrous silicate mineral in predetermined amounts are fed into a reactor in which molten steel slag has been placed, a method in which the agglomerates and hydrous silicate mineral in predetermined amounts is previously placed in a reactor, a method in which the agglomerates and hydrous silicate mineral in predetermined amounts are fed into a reactor in which molten steel slag has been placed, a method in which the agglomerates and hydrous silicate mineral in predetermined amounts is previously placed in a reactor, a method in which the agglomerates and hydrous silicate mineral in predetermined amounts is fed into a reactor together with molten steel slag.

The method of solidification and crushing in the step (4) includes a method in which molten steel slag is crushed with a crusher after spontaneous cooling thereof, a method in which the crushing is conducted by dropping molten steel slag on a disc being rotated to blow off the slag by taking advantage of its centrifugal force, a method in which the crushing is conducted by throwing molten steel slag into running wate flowing through a shoot and a method in which the crushing is conducted by blowing off molten steel slag with compressed air.

In the present invention, there is no need for conducting the bubbling operation which is required in the conventional methods, because, upon incorporation of hydrous silicate mineral in molten steel slag, the hydrous silicate mineral is decomposed by heat of the molten steel slag to generate a gas, which stirs the molten steel slag.

Further, in the present invention, the feed of a hydrous silicate mineral into molten steel slag causes modification of free CaO, MgO, $2CaO \cdot SiO_2$ and $3CaO \cdot 2SiO_2$ the presence of which is a main causative factor of swelling and crumbling of steel slag and transform them into stable compounds which can be used as civil engineering materials, e.g. $CaO \cdot SiO_2$, $2CaO \cdot Al_2O_3 \cdot SiO_2$, $2CaO \cdot MgO \cdot 2SiO_2$, $2CaO \cdot Fe_2O_3$, or $4CaO \cdot Al_2O_3 \cdot Fe_2O_3$. In this connection, it will be noted that harmful metals contained in the dust and sludge cannot be eluted. Because they enter the crystal structure of the steel slag after cooling by replacement or are immobilized by the slag in its vitrified portion. Further, in the reaction step, a stable reaction can be attained because the reaction is heated by the electric power supplied from the auxiliary electrode.

On the other hand, vaporizable metals such as lead or zinc contained in the dust and sludge are connected with a filter dust collector while metals contained in the dust, sludge and steel slag are separated by customary separation means after solidification and crushing. The metals thus collected and separated can be reused as a steel resource.

DETAILED DESCRIPTION OF PREFERRED EMBODIMENT OF THE PRESENT INVENTION

Figure 1:
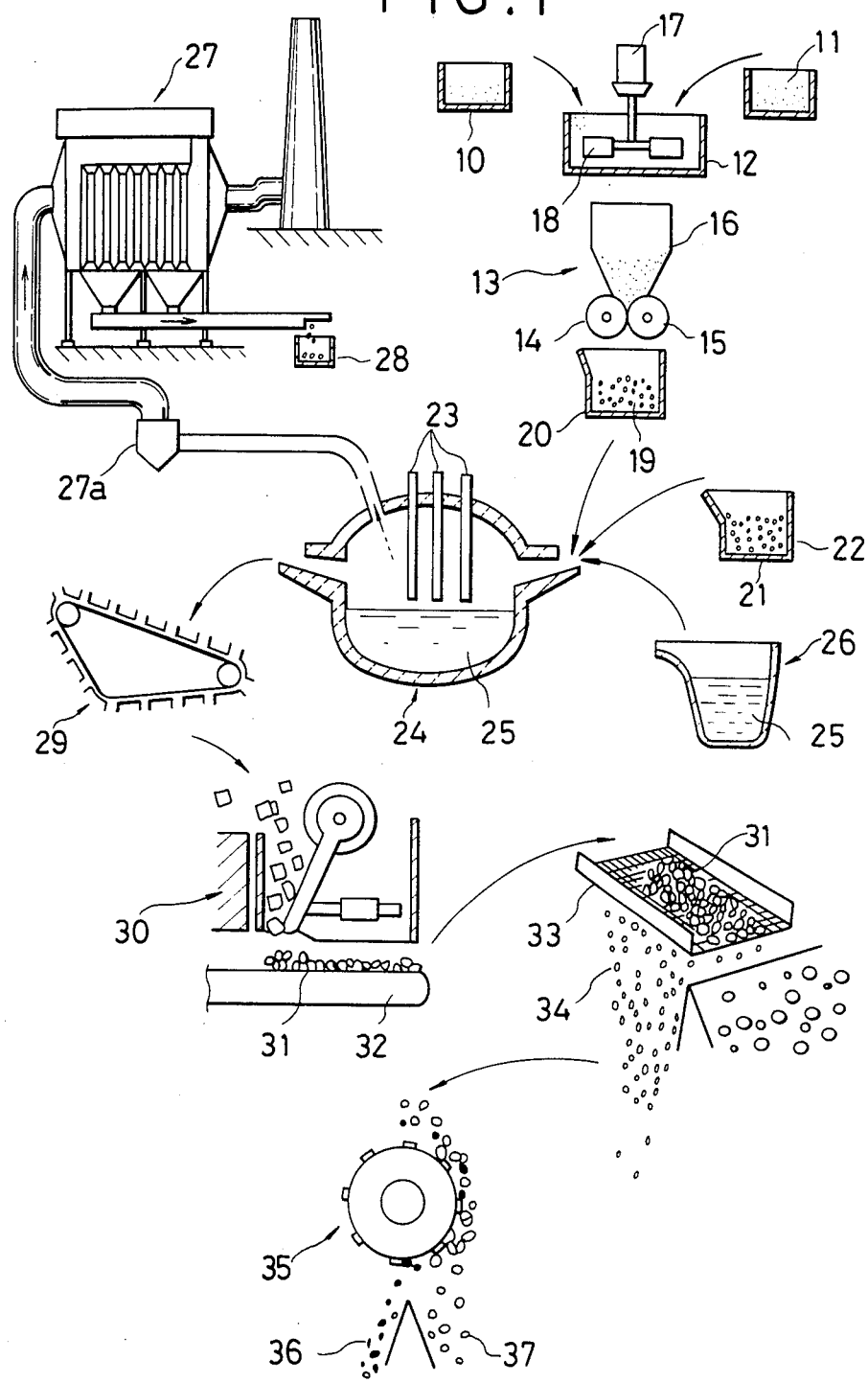
FIG. 1 is a flow diagram briefly illustrating a typical method of treating dust and sludge simultaneously with steel slag according to one embodiment of the present invention.

A mixer 12 is charged with dust and sludge 10 produced from an electric furnace and collected with a wet or dry dust collector, above 5 to 20 wt%, based on the dust and sludge, of a coke powder 11 which is an example of a reducing agent which may be used in the present invention, and about 5 to 10 wt%, based on the dust and sludge, of portland cement which is an example of a binder which may be used in the present invention. They are kneaded in the mixer 12 and then agglomerated with an agglomerator 13. The agglomerator 13 is a known apparatus and equipped with revolving rollers 14, 15 which are provided abutted against each other and which have holes of predetermined sizes opposed to each other so that a raw material fed from a hopper 16 provided at the top can be agglomerated.

The mixer 12 is equipped with a moter 17 by which a blade 18 is rotated so that the dust and sludge 10 are kneaded with the coke powder 11.

Although the present invention is described herein with reference to dust and sludge produced from an electric furnace, the present invention can also be applied to dust and sludge produced from, e.g, an open-hearth furnace.

Table 1 shows the components of dust and sludge produced from an electric furnace which are used in this example and the components of dust and sludge produced from a converter and an open hearth furnace.

TABLE 1

| | | | | | | | | (WEIGHT %) | |
|---|---|---|---|---|---|---|---|---|---|
| | Ig.loss | SiO$_2$ | Al$_2$O$_3$ | T·Fe | CaO | MgO | MnO | Zn | Pb |
| A | 18.0 | 3.0 | 1.5 | 25.2 | 1.4 | 0.9 | 2.5 | 16.8 | 0.4 |
| B | 6.8 | 1.9 | 0.2 | 59.9 | 1.9 | 0.4 | 1.4 | 0.09 | 0.07 |

A; dust from an electric furnace
B; dust from a converter

The agglomerate 19 formed by using the agglomerator 13 are collected in a vessel 20 and then fed into a reactor 24 equipped with a heating electrode 23 together with pitchstone 22 contained in a vessel 21 which is an example of a particulate hydrous silicate mineral which may be used in the present invention. Although in this example, the molten slag 25 is previously fed into the reactor 24, the molten steel slag contained in a ladle 26 may be fed into the reactor 24 at the same time that the agglomerates 19 and pitchstone 22 are fed into the reactor 24 and, alternatively, the molten steel slag 25 may be fed into the reactor 24 after the pitchstone 22 and agglomerates 19 are previously fed into the reactor 24.

In this example, the agglomerates 19 comprise a mixture of dust and sludge 10 with a coke powder 11. A hydrous silicate mineral such as pitchstone, perlite, obsidian or any mixture thereof may be added in a predetermined amount to the agglomerates 19.

Table 2 shows the components of the above-mentioned hydrous silicate minerals.

TABLE 2

| | | | | | | | | (WEIGHT %) | |
|---|---|---|---|---|---|---|---|---|---|
| | +H$_2$O | SiO$_2$ | Al$_2$O$_3$ | T·Fe | CaO | MgO | MnO | Na$_2$O | K$_2$O |
| D | 4.6 | 72.7 | 12.2 | 1.1 | 0.5 | 0.4 | — | 2.9 | 5.2 |

TABLE 2-continued

|   | +$H_2O$ | $SiO_2$ | $Al_2O_3$ | T·Fe | CaO | MgO | MnO | $Na_2O$ | $K_2O$ (WEIGHT %) |
|---|---|---|---|---|---|---|---|---|---|
| E | 1.4 | 73.1 | 12.9 | 1.7 | 0.4 | 0.2 | — | 3.8 | 3.9 |
| F | 7.4 | 69.5 | 12.2 | 1.5 | 0.4 | 0.3 | — | 3.0 | 3.6 |

D: perlite
E: obsidian
F: pitchstone

Although in this example, the molten steel slag 25 discharged from a converter is used as a molten steel slag, the present invention may also be applied to steel slags produced from other furnaces, e.g., a reducing period slag and an oxidation refining period slag which are produced from an electric furnace. Table 3 shows the components of such steel slags.

TABLE 3

|   | Ig. loss | $SiO_2$ | $Al_2O_3$ | T·Fe | CaO | MgO | MnO | $Na_2O$ | $K_2O$ (WEIGHT %) |
|---|---|---|---|---|---|---|---|---|---|
| G | +2.5 | 9.9 | 1.0 | 21.5 | 43.5 | 6.7 | 4.6 | 0.2 | 0.01 |
| H | 0.9 | 26.8 | 8.2 | 5.7 | 44.2 | 4.1 | 3.4 | 0.4 | 0.08 |
| I | +0.9 | 19.4 | 4.3 | 27.5 | 39.0 | 4.2 | 4.8 | 0.2 | 0.01 |

G: converter slag
H: reducing period slag
I: oxidation refining period slag

As soon as the agglomerates 19 and pitchstone 22 are incorporated into the molten steel slag 25, the water of crystallization present in the pitchstone 22 is decomposed into water vapor, causing the molten steel slag 25 to be stirred. Therefore, the larger the amount of the water of crystallization, the more sufficiently the molten steel slag stirred. For this reason, it is preferred that when a hydrous silicate mineral of which the content of water of crystallization is low (e.g. obsidian), such a silicate material is used in the form of a mixture thereof with a substance containing a large amount of water of crystallization, such as alum.

In the above step in which the molten steel slag 25 is stirred, since the feeding of the agglomerates 19 and pitchstone 22 into the reactor lowers the temperature of the system, a current is flowed through the heating electrode 23 to heat the molten steel slag 25 by means of arc heating or resistance heating and to maintain the temperature at 1450 to 1550° C. for 15 to 20 min. Metals such as zinc and lead are vaporized through the above steps. The vaporized metals such as zinc and lead are completely oxidized in an oxidizing chamber 27a equipped with an air inlet opening, recovered in the form of oxides by section with a filter cloth dust collector 27 and stored in a container 28 for use as a metal resource.

The iron oxide contained in the dust and sludge is reduced to a particulate iron and mixed in the slag together with the iron contained in the molten steel slag, while the silicate contained in the pitchstone serves to modify free CaO, free MgO, 2CaO · $SiO_2$ and 3CaO · $2SiO_2$, the presence of which is a main causative factor of swelling and crumbling of steel slag, into stable compounds which can be used as civil engineering materials, e.g. CaO · $SiO_2$, 2CaO · $Al_3O_3$ · $SiO_2$, 2CaO · MgO · $2SiO_2$, 2CaO · $Fe_2O_3$ or 4CaO · $Al_2O_3$ · $Fe_2O_3$. Further, harmful metals contained in the dust and sludge will not leach out because they enter the crystal structure of the steel slag after cooling by replacement or are immobilized by the slag in its vitrified portion.

The molten steel slag modified through the above steps is solidified and crusheed, followed by recovery of metals therefrom by a customary separation means which will be described below in detail.

The molten steel slag 25 treated in the reactor 24 in the above steps is solidified and crushed. In this step, the molten steel slag 25 is solidified into a predetermined size with a slag casting machine 29 equipped with boxes having a predetermined size which are continuously moved and then crushed with a jaw crusher 30 which is an example of crushers which may be used in the present invention.

The steel slag 31 thus crushed is separated by an ordinary means as will be described below. Specifically, the steel slag 31 is carried with a conveyer 32 to a sieve 33 where a steel slag 34 having a predetermined particle size or smaller is sifted, while a steel slag 31 having a particle size exceeding a predetermined value is crushed with a crusher and sifted with the sieve 33.

The steel slag 34 having a predetermined size or smaller thus sifted with the sieve 33 is separated with a magnetic separator 35, which is an example of separators which may be used in the present invention, into components attracted by magnetic force 36, such as Fe, Cr and Ni, and a steel slag 37 freed from the components attracted by magnetic force.

Although in this example the molten steel slag 25 was solidified into a predetermined size with a slag casting machine 29, the solidification and crushing of the molten slag may be conducted by other methods, e.g. a method which comprises discharging the molten steel slag from the reactor into a suitable place to allow it to solidify, breaking the solidified steel slag with a hydraulic breaker and crushing the broken slag with the above-mentioned jaw crusher 30. Further, although in this example the magnetic separator 35 was used as a separator, the separation between the metallic components and the non-metallic components may also be conducted by other known methods such as a method in which a specific gravity separator is used and air classification.

The results of the chemical analysis on a slag produced through the above steps are shown in Table 4, while the results of elusion tests on the slag are shown in Table 5.

TABLE 4

|   | Ig. loss | $SiO_2$ | $Al_2O_3$ | T·Fe | CaO | MgO | MnO | $Na_2O$ | $K_2O$ (WEIGHT %) |
|---|---|---|---|---|---|---|---|---|---|
| J | — | 18.7 | 4.5 | 18.2 | 33.8 | 2.3 | 1.3 | 0.3 | 0.3 |

J: modified converter slag

TABLE 5

|   | Cd | Pb | Zn | As | $Cr^{6+}$ | T·Hg | Cn (mg/l) |
|---|---|---|---|---|---|---|---|
| J | ND | ND | ND | ND | ND | ND | ND |

J: modified converter slag
(Elution Test According to Notification of the Environmental Agency)

As can be seen from Table 5, the harmful metals contained in the dust and sludge are almost completely immobilized by the modified slag, and the modified slag can be safely used as a civil engineering material.

The calculation of the recovery ratio of zinc and lead based on the amounts of zinc oxide and lead oxide both collected with the filter cloth dust collector 27 and those of zinc and lead contained in the above dust and sludge showed that the recovery ratios of zinc and lead in the case of a reaction conducted at about 1500° C for about 30 min were 82% and 96%, respectively, although they vary depending on the reaction temperature and reaction time of the molten steel slag. Therefore, it can be said that zinc and lead contained in the dust and sludge can almost completely recovered and effectively reused as resources while, as mentioned above, lead etc. remaining unrecovered are immobilized by the modified steel slag so that they will not be eluted under ordinary conditions.

Although in this example the molten steel slag 25 was solidified and crushed using a slag casting machine 29 and the crusher which is a physical crushing means, the solidification and crushing of the molten steel slag 25 may also be conducted with apparatuses as shown in FIGS. 2, 3, 4, 5 and 6 on which some description will be given below.

Figure 2:
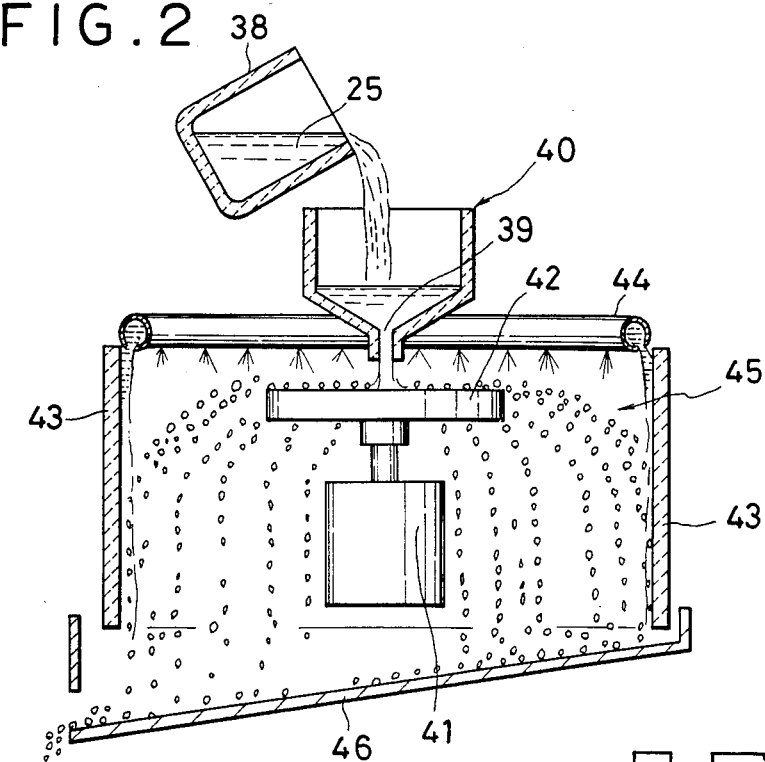
FIG. 2 is a sectional side elevation of a disc crusher employed in the embodiment as shown in FIG. 1.

In an apparatus as shown in FIG. 2, the molten steel slag which has been accommodated in the ladle 38 is transferred to a receiving vessel 40 having pores 39 at its bottom, where the molten steel slag 25 is gradually dropped on a disc 42 being rotated with a motor 41, thereby splashing the molten steel slag 25 in the radial direction thereof by centrifugal force caused as the result of rotation of the disc to crush the molten steel slag 25.

A side wall 43 is provided around the disc 42, and the inside of the side wall 43 at its top is equipped with a water pipe 44 provided with a number of holes at predetermined intervals for injecting water. Therefore, the steel slag 45 splashed in the radial direction of the disc is rapidly cooled to form small particles, which are collected in a receiving vessel 46 provided at the bottom. In this connection, it will be noted that the slag component and the metal component can be separated from each other by taking advantage of the difference in distance at which the both components are splashed by the centrifugal force developed by providing a side wall having a suitable radius.

Figure 3:
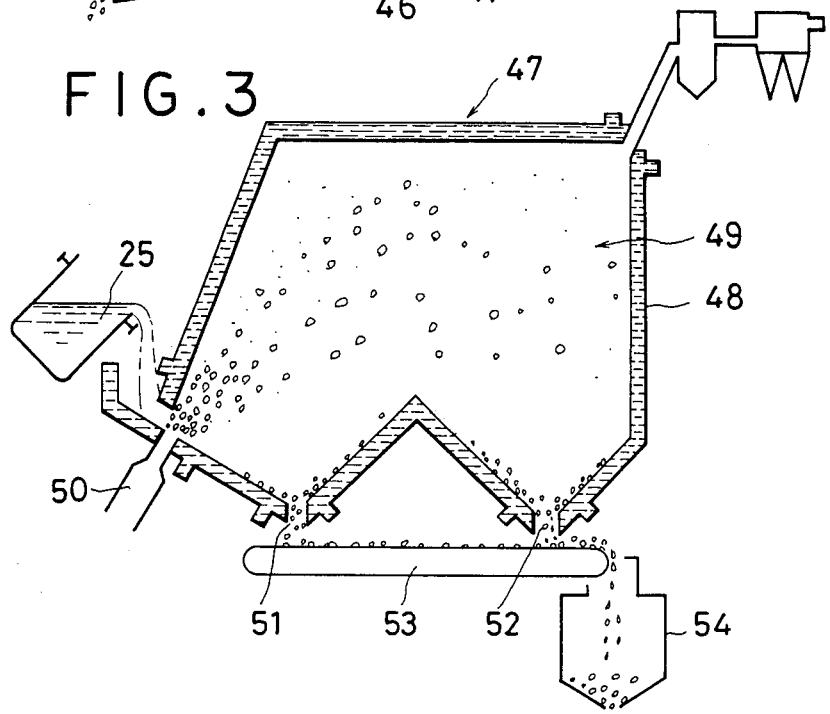
FIG. 3 is a sectional side elevation of an air crusher employed in the embodiment as shown in FIG. 1.

In an air crusher 47 as shown in FIG. 3, a part of the inside of a chamber 49 surrounded by a water-cooled wall 48 is equipped with a nozzle 50 from which a high-pressure air is injected. The molten steel slag 25 is flowed at the position of an injection hole of the nozzle 50 to splash and, at the same time, to solidify it. The solidified slag is discharged from discharging ports 51, 52, dropped on a conveyor 53, and collected in a receiving vessel 54.

Figure 4:
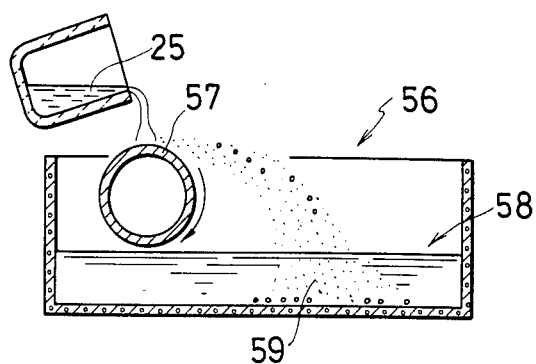
FIG. 4 is a sectional side elevation of a first water crusher employed in the embodiment as shown in FIG. 1.

In a first water crusher 56 as shown in FIG. 4, a rotating drum 57 is provided on the surface of a water vessel 58, the molten steel slag 25 is dropped from the top to splash the molten steel slag 25 into the water vessel 58, causing the molten steel slag 25 to be solidified, and crushed into a particulate form. The particulate steel slag 59 precipitates at the bottom of the water vessel 58. They are collected with a lake etc. at an appropriate time.

Figure 5:
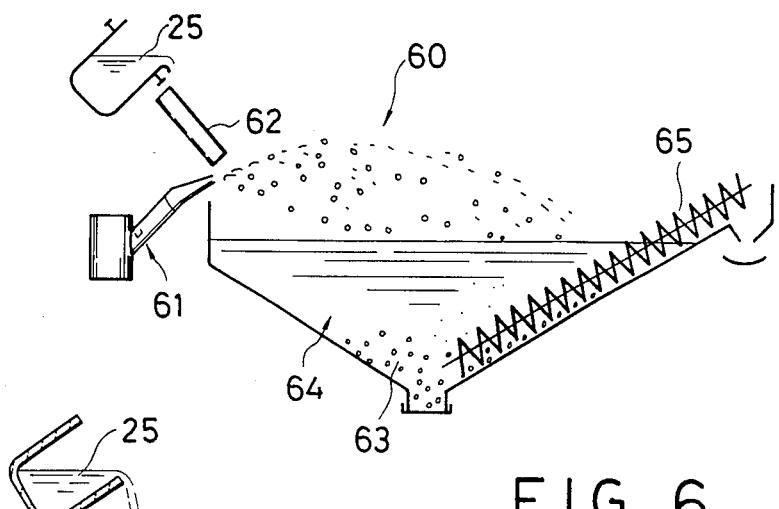
FIG. 5 is a sectional side elevation of a second water crusher employed in the embodiment as shown in FIG. 1.

In a second water crusher 60 as shown in FIG. 5, the molten slag 25 is gradually fed into a shoot 62 equipped with a high-pressure water injecting apparatus 61 to splash the molten steel slag 25 with the high-pressure water, causing the molten steel slag 25 to be solidified and crushed.

The splashed particulate steel slag 63 is accumulated in a water vessel 64 and collected at an appropriate time by taking it up with a Akins classifier 65.

Figure 6:
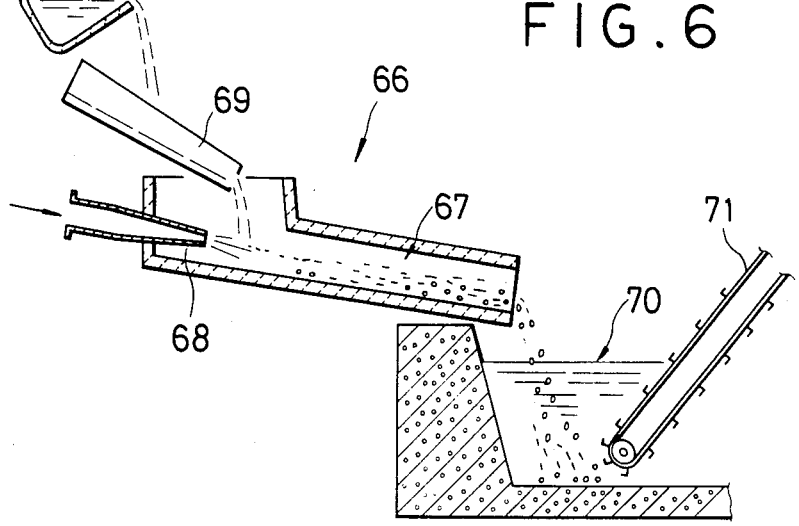
FIG. 6 is a sectional side elevation of a third water crusher employed in the embodiment as shown in FIG. 1.

In a third water crusher 66 as shown in FIG. 6, a slanted shoot 67 at its top end is provided with an injecting port 68 for injecting a high-pressure water. The molten steel slag 25 is dropped in front of the discharging port 68 through a guide shoot 69, thereby splashing the molten steel slag 25 with the high-pressure water to solidify and crush it. The steel slag which has been solidified and crushed is passed through the shoot 67, precipitated at the bottom of a water vessel 70, and carried to the outside with a conveyor 71.

The steel slag which has been solidified and crushed through the above steps are separated into the metal component and the slag component by ordinary separation means.

What is claimed is:

1. A method of treating dust, sludge and steel slag simultaneously, comprising the steps of:
    (1) agglomerating, using an agglomerator, the dust and sludge produced from a steel making process, with a reducing agent, in the amount of 5 to 20 wt% based on the weight of the dust and sludge, into agglomerates having 5 to 80 mm grain size,
    (2) charging into a reactor provided with a heating electrode, molten slag to be treated, with 5 to 30 wt% of the agglomerates and 5 to 20 wt% of a hydrous silicate mineral, based on the weight of the molten slag, and bubbling the mixture, accompanied by a slag modifying reaction, by decomposing the hydrous silicate mineral at at least a specified temperature achieved by energizing the heating electrode,
    (3) recovering lead and zinc vaporized from said molten steel slag in step (2) by using a filtered dust collector,
    (4) solidifying and crushing the molten steel slag treated in step (2), and
    (5) separating the crushed steel slag into metal and slag components by ordinary separation means.

2. A process according to claim 1, wherein said hydrous silicate mineral is obsidian, perlite, pitchstone or a mixture of two or more of them.

3. A process according to claim 1, wherein said agglomerates produced in the step (1) are preheated before incorporation thereof into said molten steel slag.

4. A process according to claim 1, wherein said solidification and crushing in the step (4) are conducted by naturally cooling said molten steel slag and then crushing it using a crusher.

5. A process according to claim 1, wherein said solidification and crushing in step (4) are conducted by dropping said molten steel slag on a rotating disc to splash said molten steel slag by the centrifugal force thereof.

6. A process according to clame 1, wherein said solidification and crushing in the step (4) are conducted by charging said molten steel slag into running water flowing through a trough.

7. A process according to claim 1, wherein said solidification and crushing in the step (4) are conducted by blowing said molten steel slag off with compressed air.

* * * * *